(12) United States Patent
Lee et al.

(10) Patent No.: US 12,474,711 B2
(45) Date of Patent: Nov. 18, 2025

(54) DRIVING APPARATUS AND OPERATING METHOD THEREOF

(71) Applicant: SEMES CO., LTD., Chungcheongnam-do (KR)

(72) Inventors: Seung Chan Lee, Chungcheongnam-do (KR); Ho Young Lee, Chungcheongnam-do (KR); Wang Hyeon Son, Chungcheongnam-do (KR); Woo Sang Kwon, Chungcheongnam-do (KR); Sun Oh Kim, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 140 days.

(21) Appl. No.: 18/376,124

(22) Filed: Oct. 3, 2023

(65) Prior Publication Data
US 2024/0210945 A1    Jun. 27, 2024

(30) Foreign Application Priority Data
Dec. 26, 2022    (KR) .................. 10-2022-0183904

(51) Int. Cl.
*G05D 1/00*    (2024.01)
*B25J 9/16*    (2006.01)

(52) U.S. Cl.
CPC .......... *G05D 1/0214* (2013.01); *B25J 9/1653* (2013.01); *G05D 1/0276* (2013.01)

(58) Field of Classification Search
CPC .............. G05D 1/0214; G05D 1/0276; G05D 2107/70; G05D 1/0287; B25J 9/1653; B25J 11/008; B25J 5/00; B25J 9/0009; B25J 9/1679; B25J 13/089; B25J 15/0004; B25J 19/02; B25J 9/162; B25J 21/005
See application file for complete search history.

(56) References Cited

U.S. PATENT DOCUMENTS 9,081,057 B2     7/2015 Kim et al.
2018/0330319 A1* 11/2018 Liang .................... G08G 1/202
2022/0357740 A1* 11/2022 Kim ..................... G05D 1/0295
(Continued)

FOREIGN PATENT DOCUMENTS

| JP | 11-238456 | 8/1999 |
|---|---|---|
| KR | 10-1193950 | 10/2012 |
| KR | 10-2013-0044484 | 5/2013 |

(Continued)

OTHER PUBLICATIONS

Office Action dated May 22, 2025 for Korean Patent Application No. 10-2022-0183904 and its English translation from Global Dossier.

*Primary Examiner* — Bao Long T Nguyen
(74) *Attorney, Agent, or Firm* — WOMBLE BOND DICKINSON (US) LLP

(57) ABSTRACT

A driving system is provided. The driving system includes: a driving apparatus performing a handling operation for handling a target object; and an auxiliary driving apparatus performing an auxiliary handling operation that assists the handling operation of the driving apparatus, wherein the driving apparatus and the auxiliary driving apparatus are interlinked using a wireless communication method to operate for the transportation and loading of the target object.

19 Claims, 17 Drawing Sheets

(56) References Cited

U.S. PATENT DOCUMENTS

2024/0158119 A1* 5/2024 Bott ................. B65B 3/003

FOREIGN PATENT DOCUMENTS

| KR | 10-1965141 | 4/2019 |
| --- | --- | --- |
| KR | 10-2020-0133272 | 11/2020 |
| KR | 10-2021-0057238 | 5/2021 |
| KR | 10-2022-0001840 | 1/2022 |
| KR | 10-2022-0104387 | 7/2022 |

* cited by examiner

【FIG. 1】
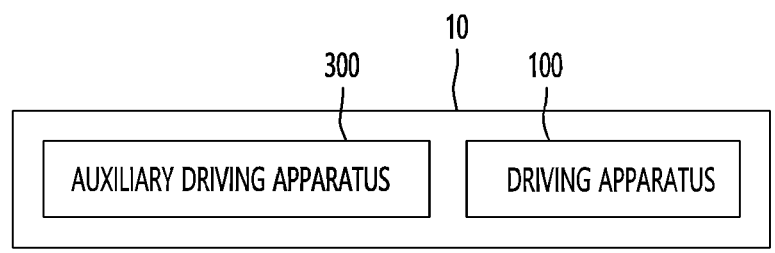
【FIG. 2】
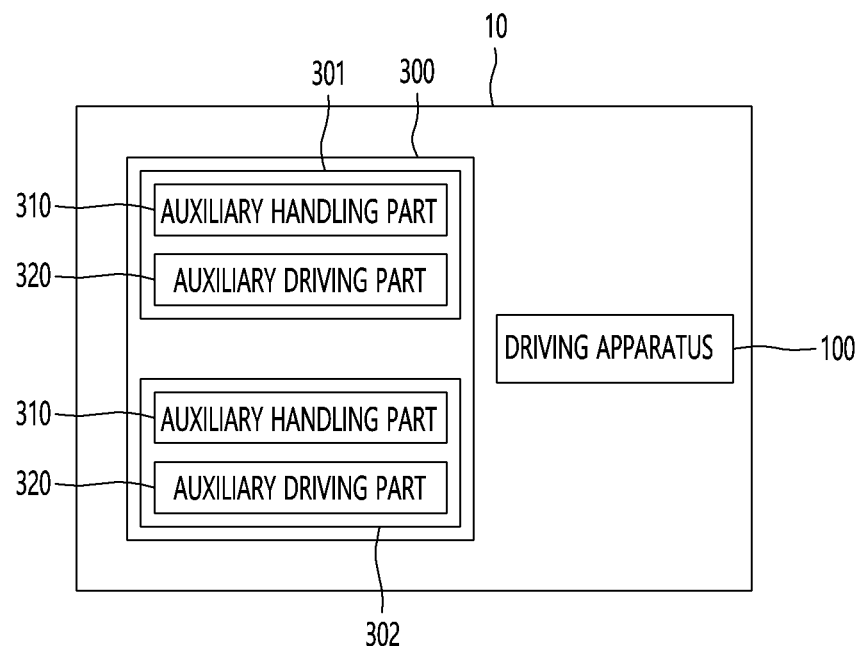

[FIG. 3]
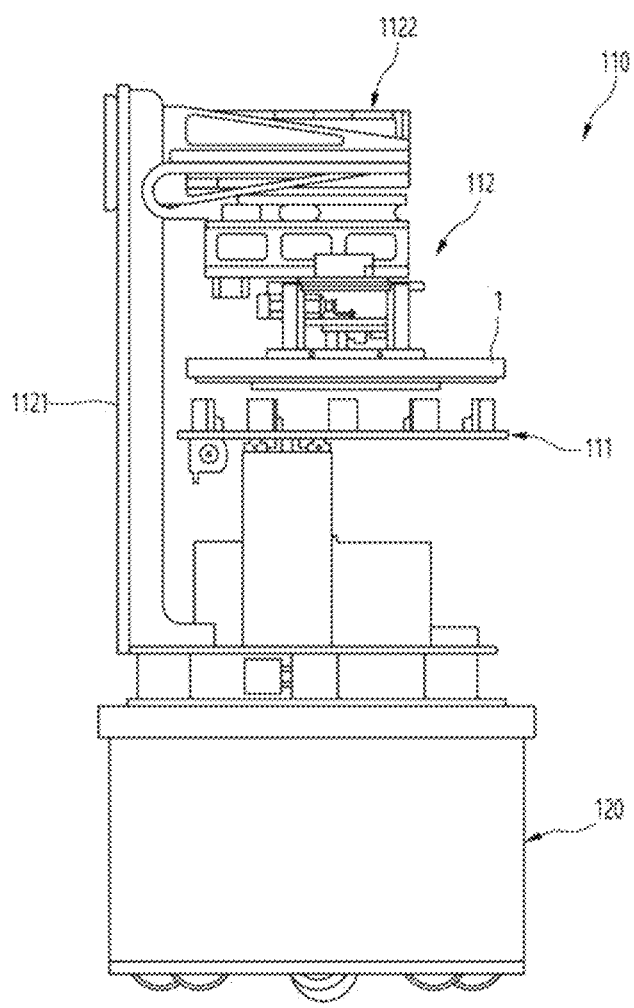

[FIG. 4]
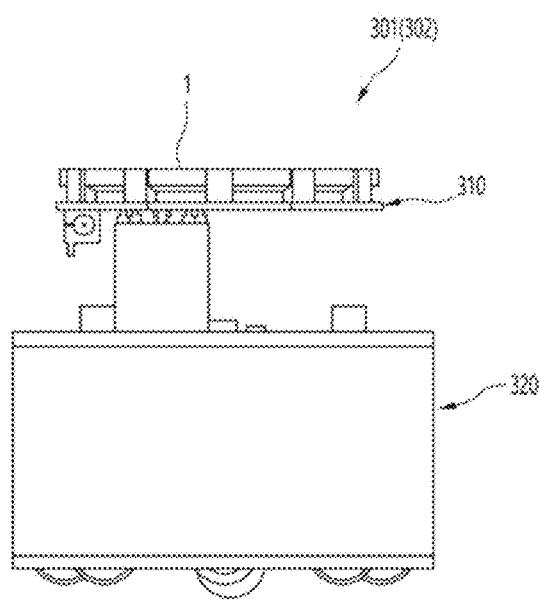
[FIG. 5]
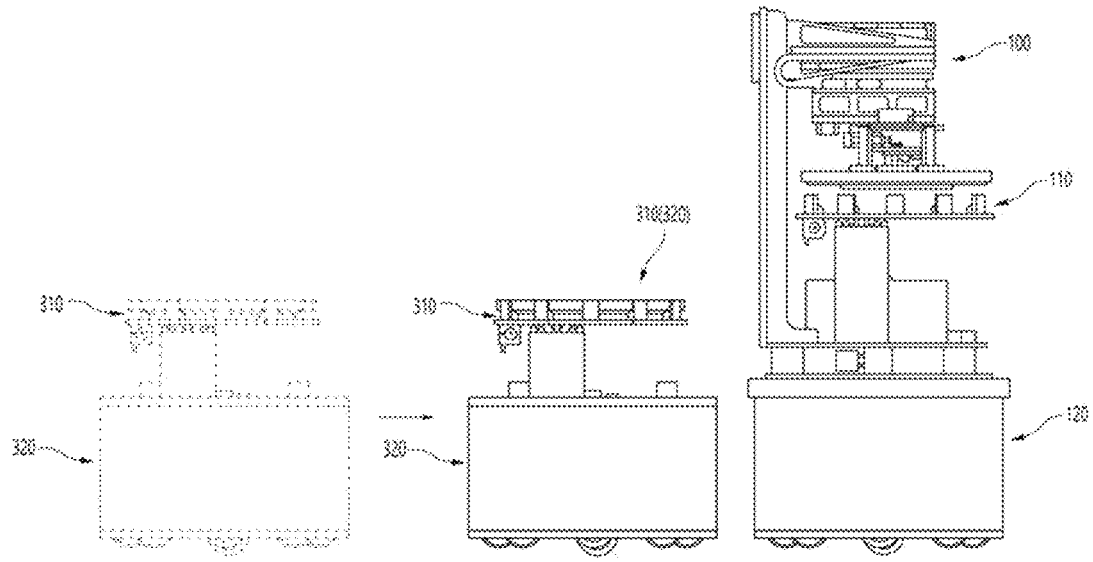

[FIG. 6]
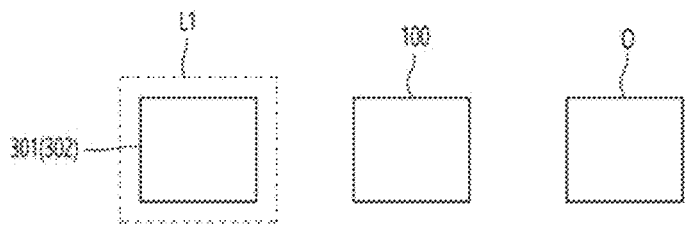
[FIG. 7]
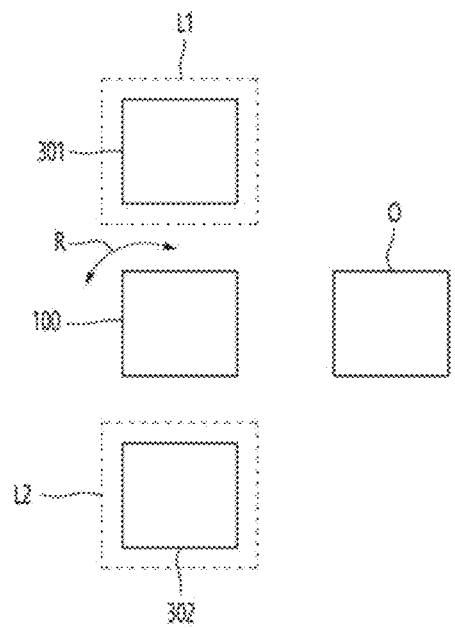

[FIG. 8]
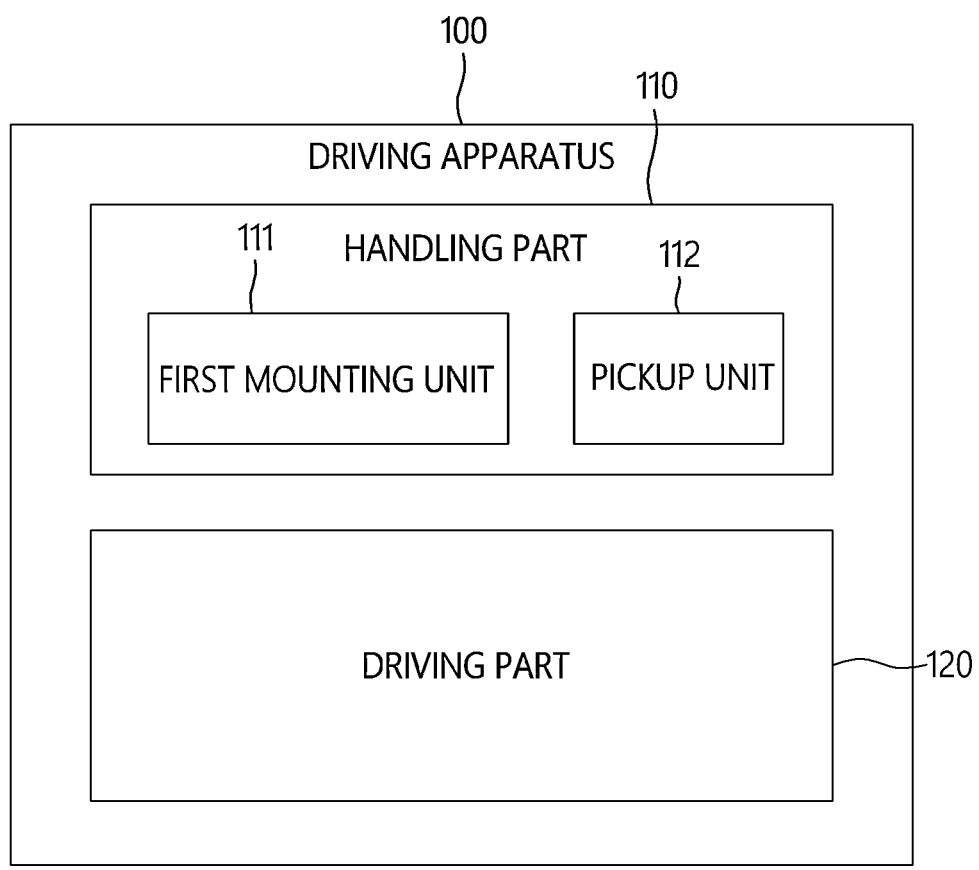

[FIG. 9]
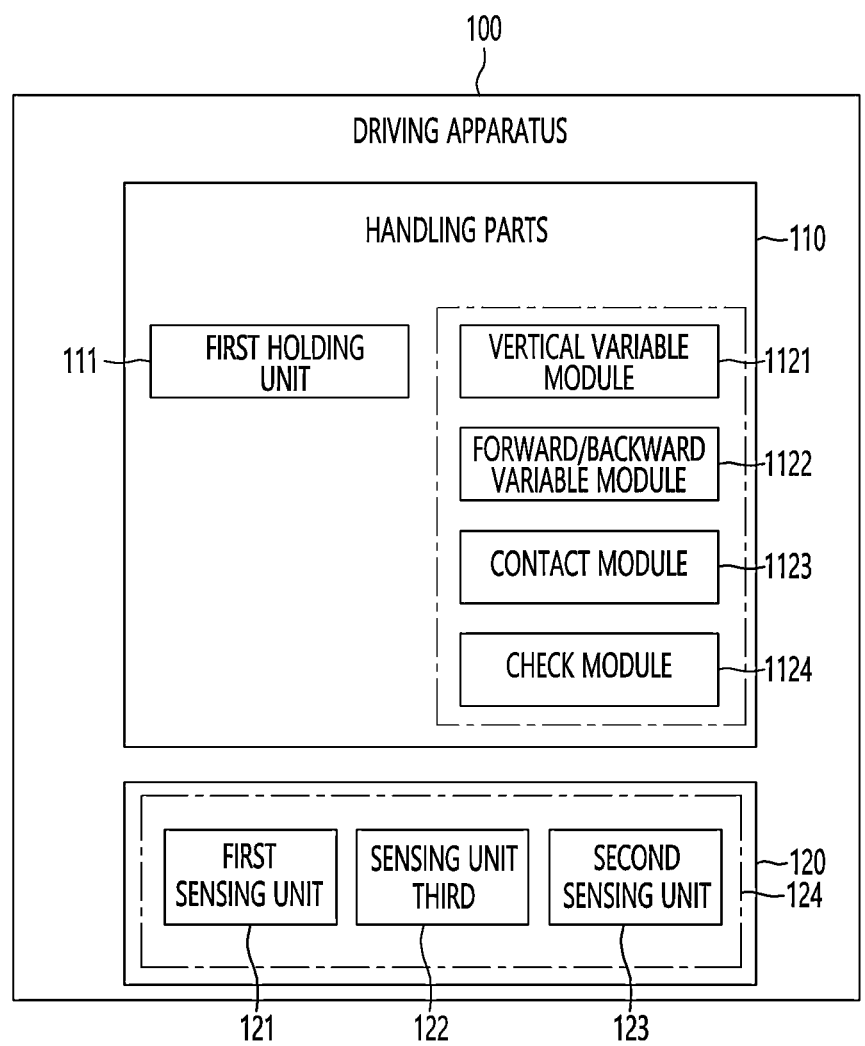

[FIG. 10]
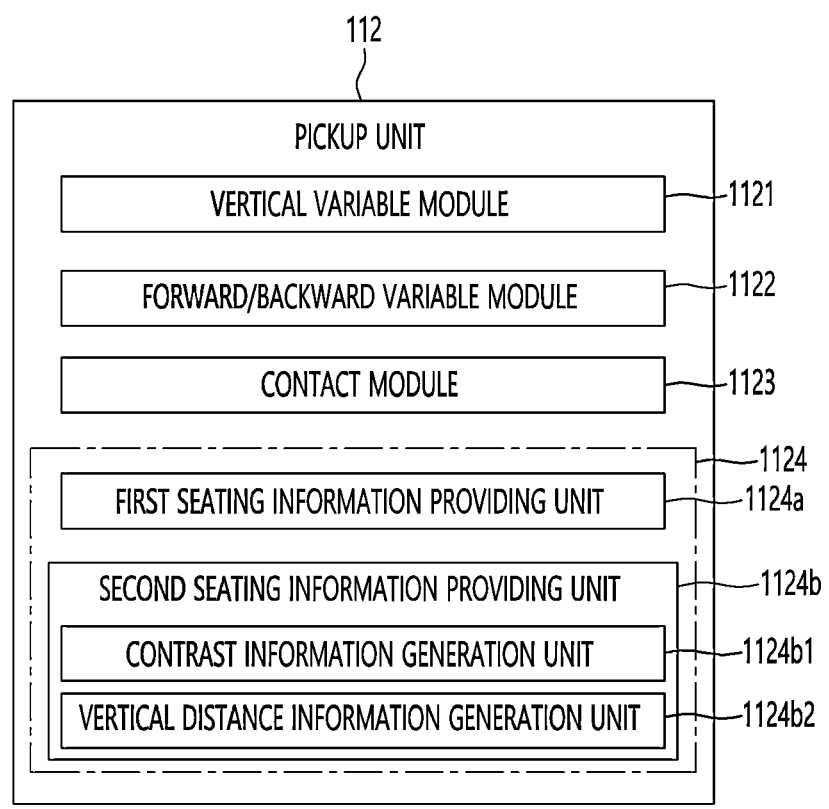

[FIG. 11]
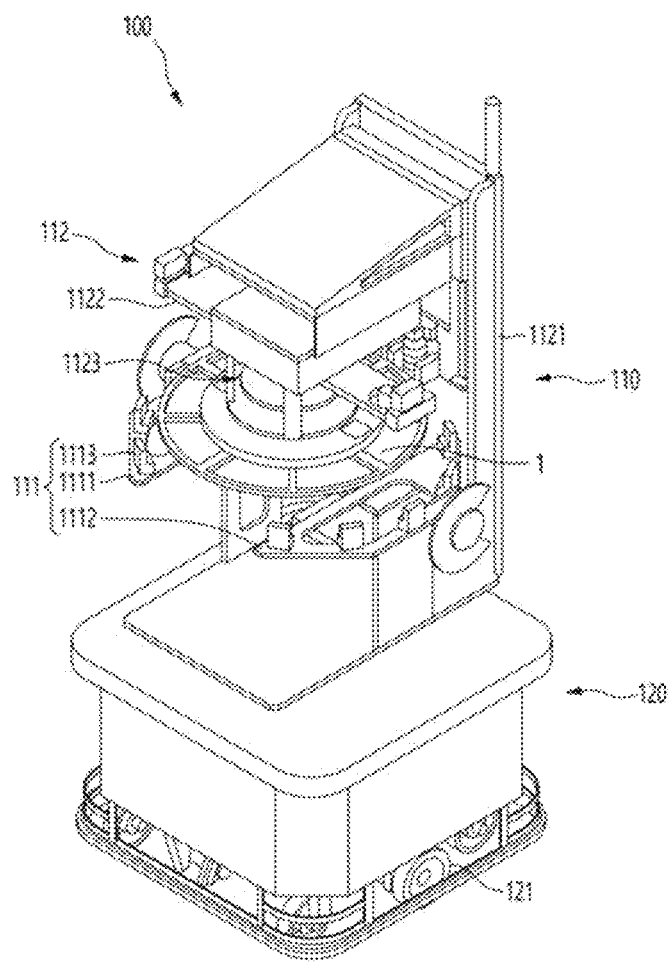

[FIG. 12]
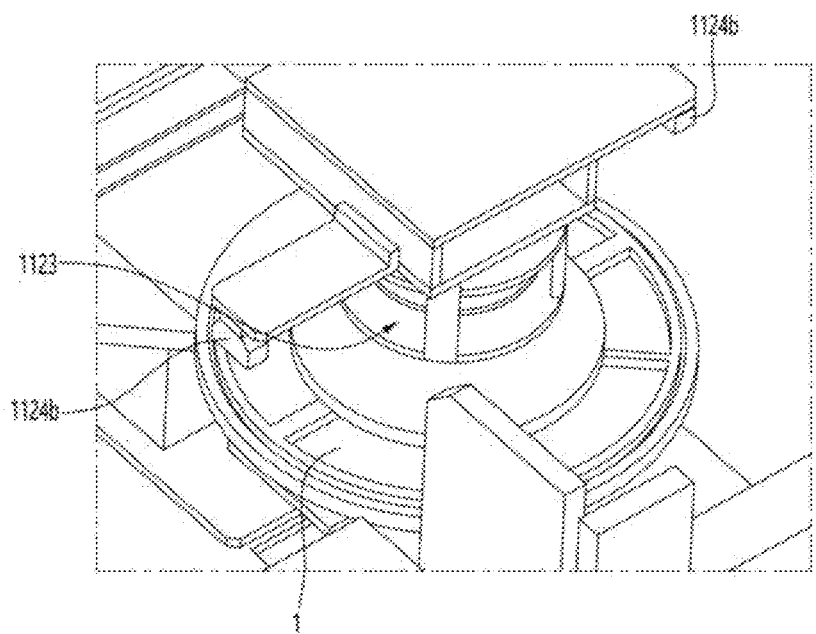
[FIG. 13]
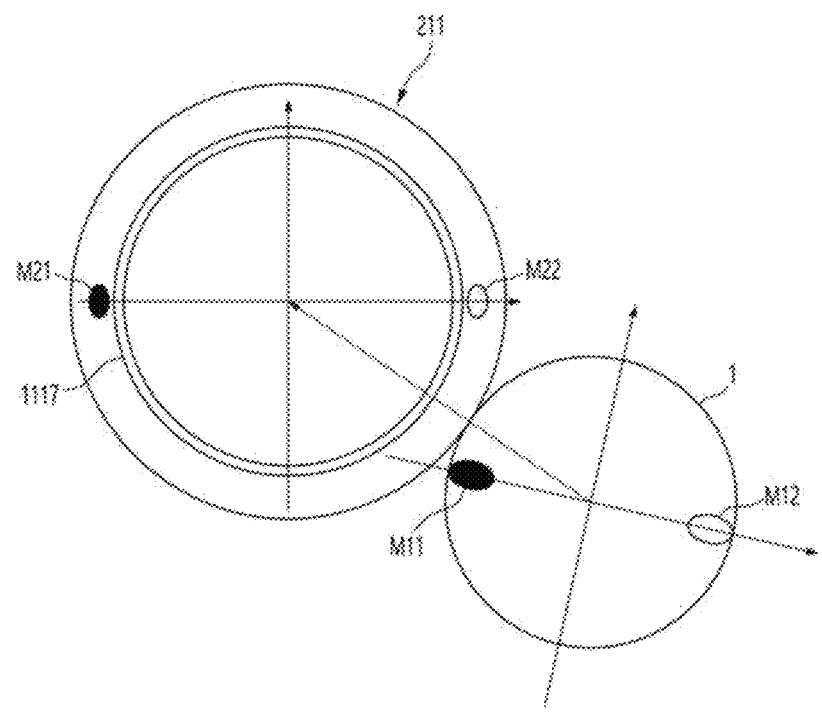

[FIG. 14]
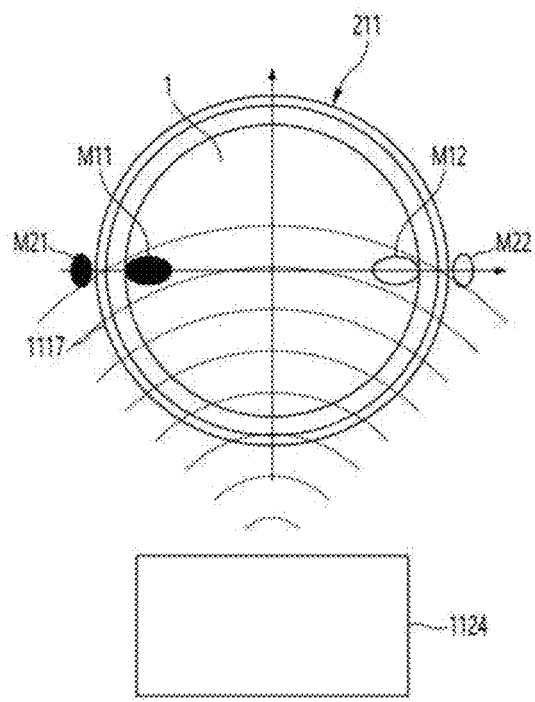
[FIG. 15]
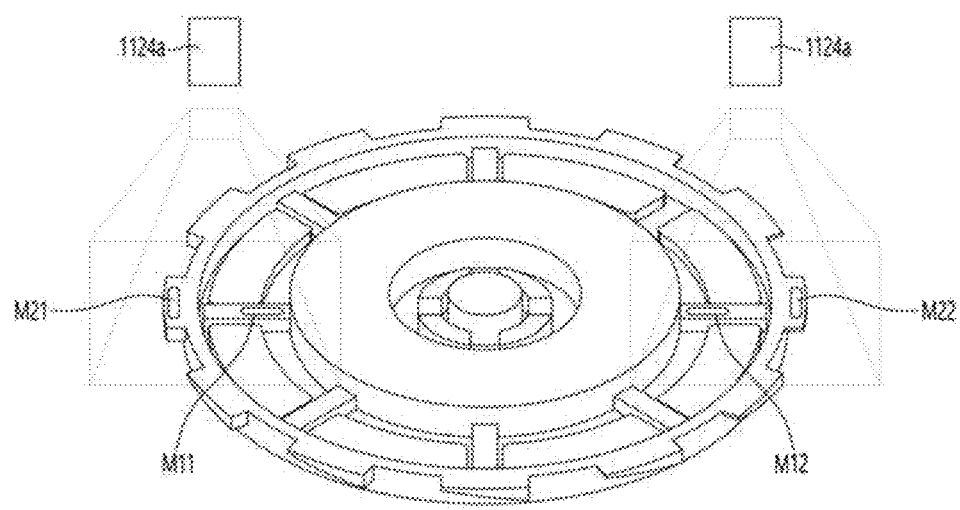

【FIG. 16】
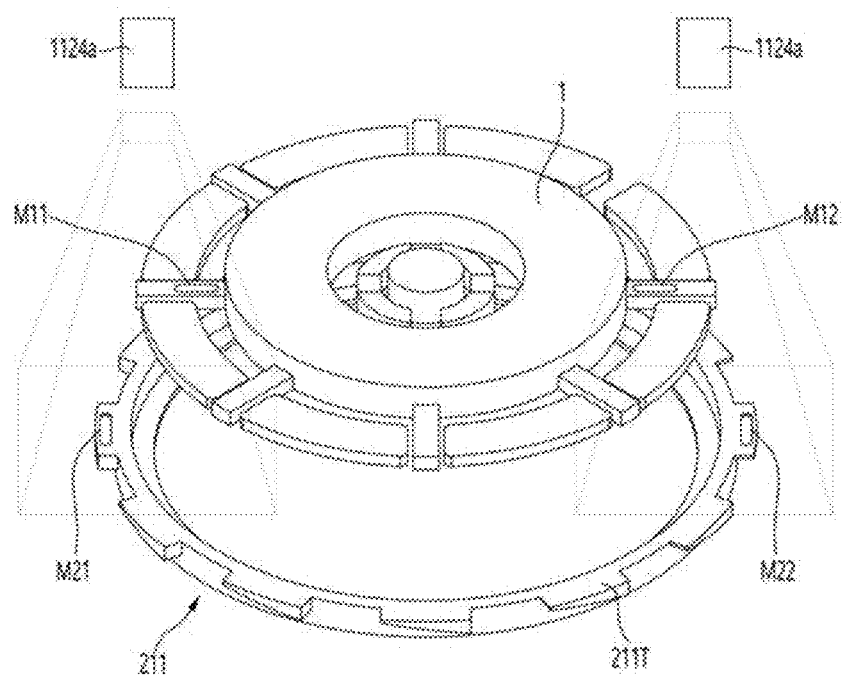
【FIG. 17】
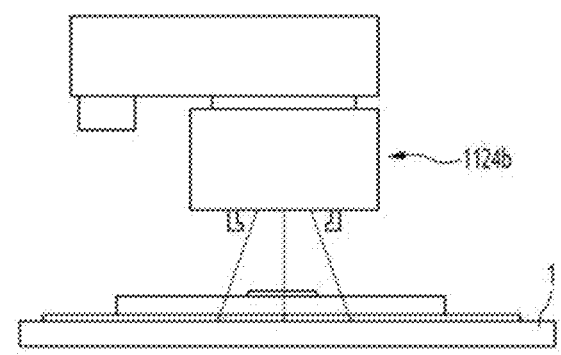

[FIG. 18]
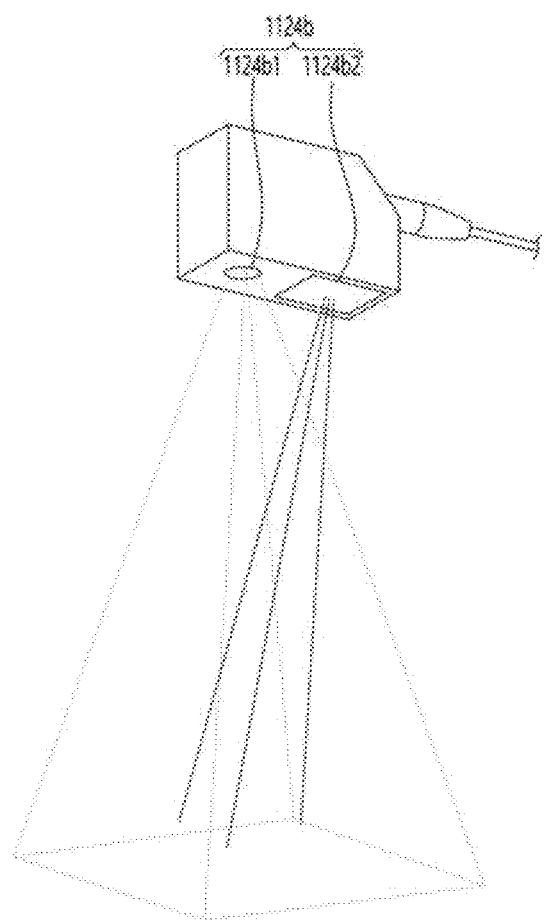

[FIG. 19]
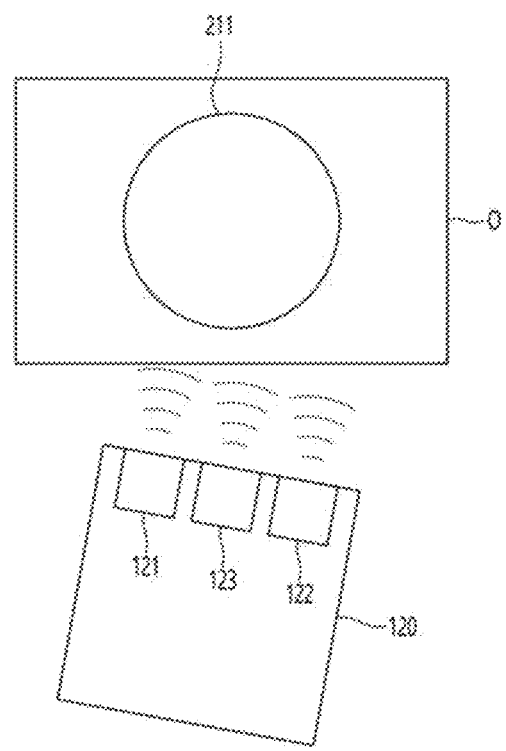

[FIG. 20]
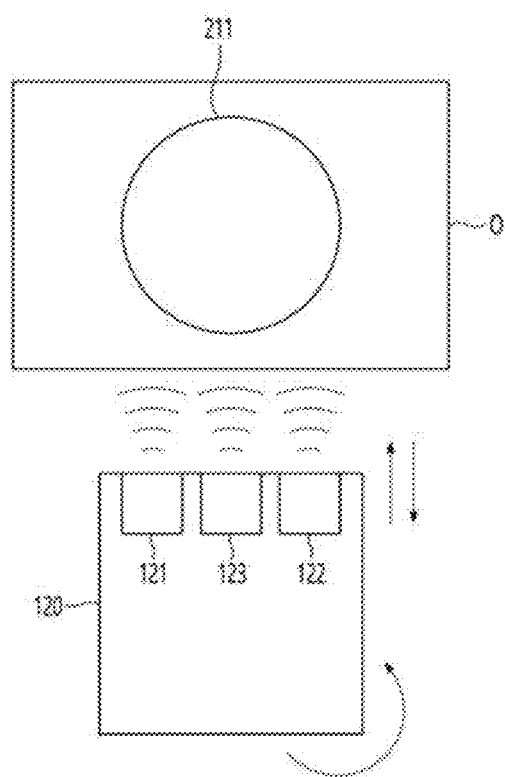

[FIG. 21]
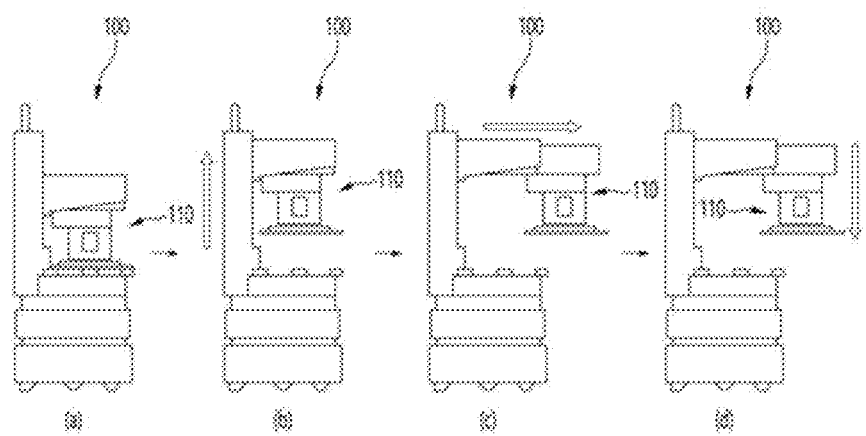
[FIG. 22]
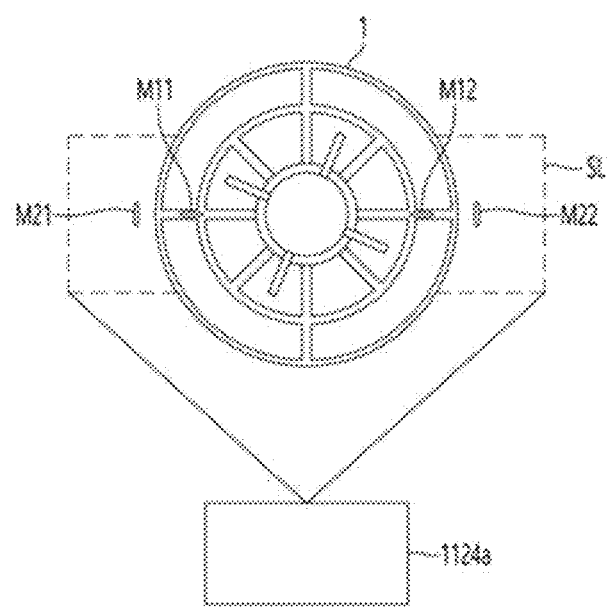

[FIG. 23]
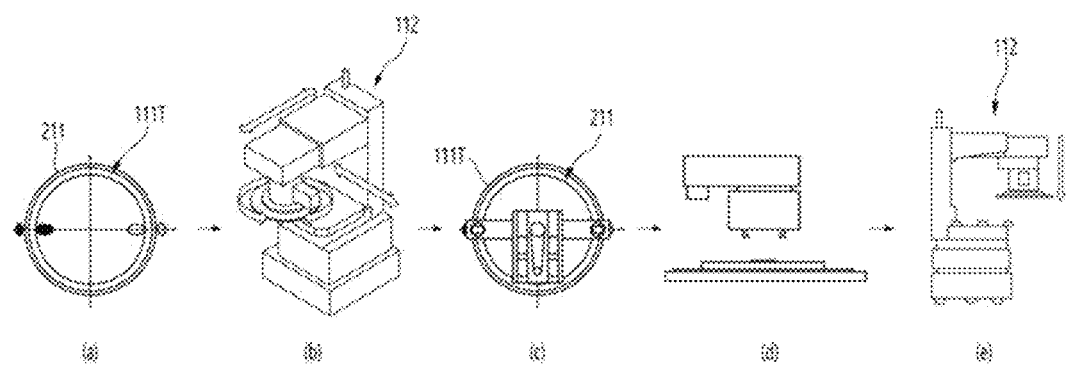
[FIG. 24]
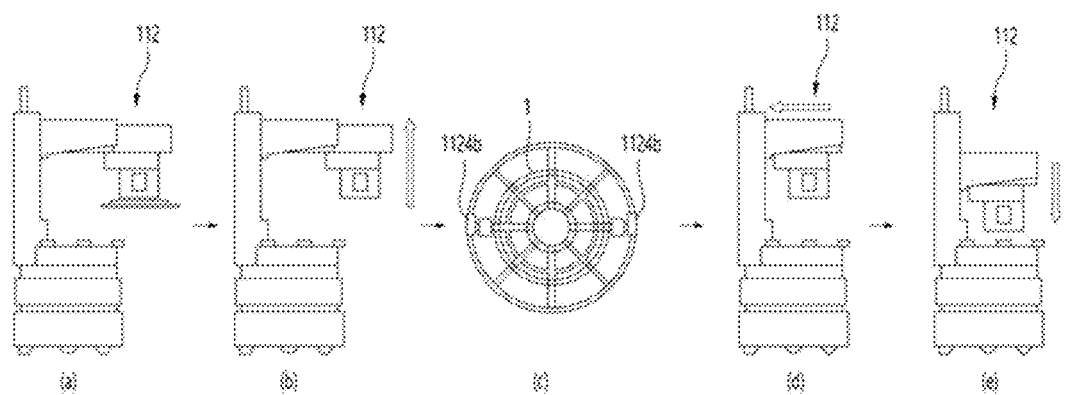
[FIG. 25]
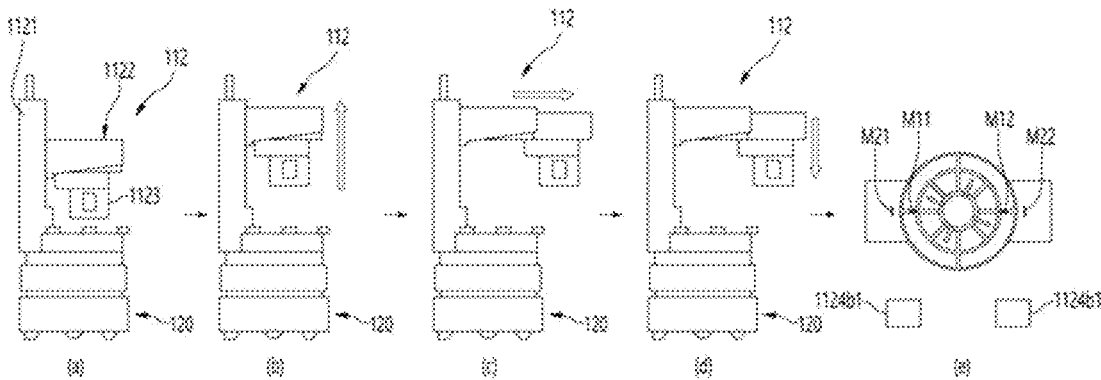

[FIG. 26]
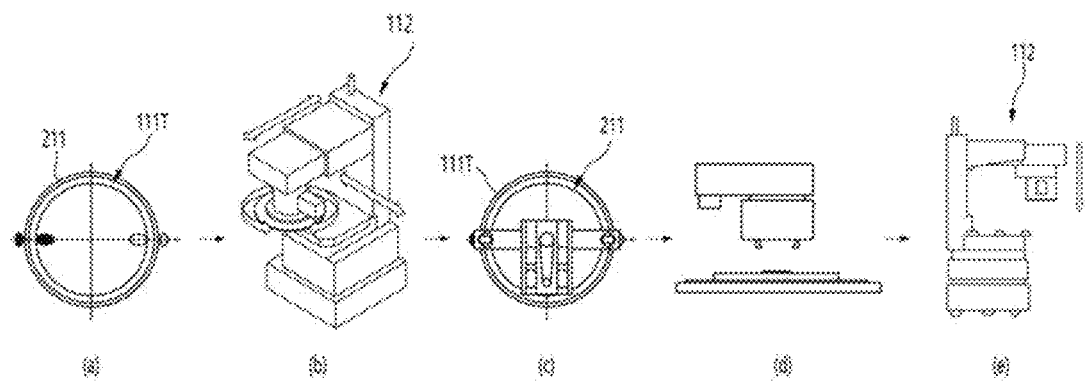
[FIG. 27]
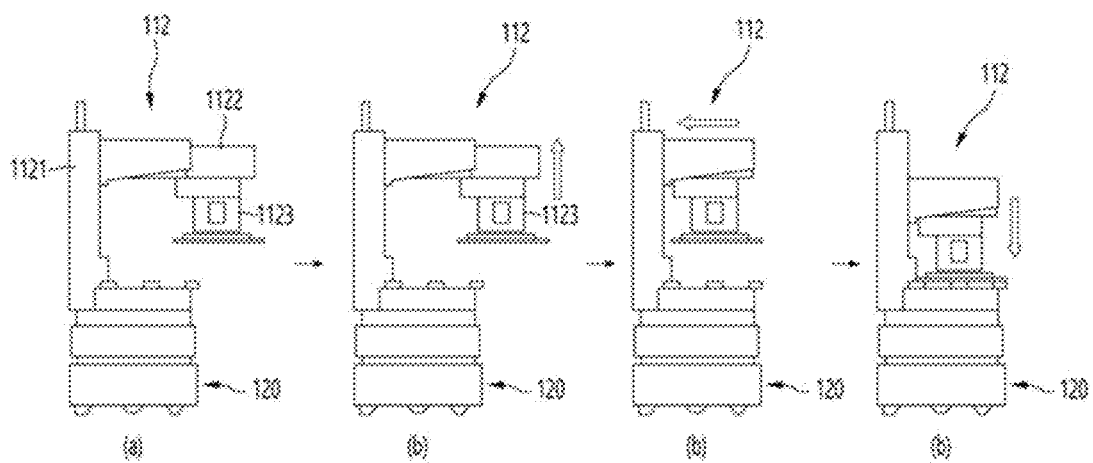
[FIG. 28]
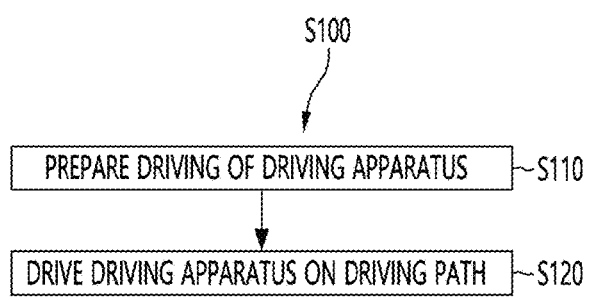

DRIVING APPARATUS AND OPERATING METHOD THEREOF

CROSS-REFERENCE TO RELATED APPLICATION

This application claims priority from Korean Patent Application No. 10-2022-0183904 filed on Dec. 26, 2022 in the Korean Intellectual Property Office, and all the benefits accruing therefrom under 35 U.S.C. 119, the contents of which in its entirety are herein incorporated by reference.

BACKGROUND

1. Field

The present disclosure relates to a driving system.

2. Description of the Related Art

With the advancement of robotics technology, autonomous driving-based transportation is being carried out. Autonomous driving robots are used for various purposes. The autonomous driving robots can handle a variety of objects within their line of path, such as substrates, probe cards, etc. Usually, the autonomous driving robots are limited simply to the tasks of loading and transporting objects, with insufficient technological developments in the efficient handling of objects and their operations. As a result, there are disadvantages in terms of the lack of ease in the comprehensive operation of main robots that handle objects and sub-robots that assist with the handling of the objects.

SUMMARY

Aspects of the present disclosure aim to comprehensively operate multiple robots to ensure accurate and safe acquisition and loading of target objects during the driving of a driving apparatus from the starting point to the destination.

Aspects of the present disclosure also aim to prevent potential accidents such as personal injuries and product damage that may arise from manual handling of relatively heavy loads of target objects.

Aspects of the present disclosure also aim to prevent the accumulation of workload resulting from repetitive manual handling of target objects, as well as the decrease of workability.

Aspects of the present disclosure also aim to perform proactive management and post-management in connection with the acquisition and loading of target objects, ensuring that the target objects are appropriately positioned within predetermined ranges.

Aspects of the present disclosure also aim to prevent anomalies in function tests and subsequent processes that may arise from deviations of target objects from their predetermined positions, through proactive management and post-management.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a driving system includes: a driving apparatus performing a handling operation for handling a target object; and an auxiliary driving apparatus performing an auxiliary handling operation that assists the handling operation of the driving apparatus, wherein the driving apparatus and the auxiliary driving apparatus are interlinked using a wireless communication method to operate for the transportation and loading of the target object.

According to another aspect of the present disclosure, a driving system includes: a driving apparatus performing a handling operation for handling a target object; and an auxiliary driving apparatus performing an auxiliary handling operation that assists the handling operation of the driving apparatus, wherein the driving apparatus and the auxiliary driving apparatus are interlinked using a wireless communication method to operate for the transportation and loading of the target object, the auxiliary driving apparatus includes first and second auxiliary driving devices, which interlock with the driving apparatus, the first and second auxiliary driving devices sequentially interlock with the driving apparatus to enable the handling operation, the driving apparatus performs a first collection operation of collecting any replacement target object at a destination and a first loading operation of loading the replacement target object, collected by the first collection operation, in the first auxiliary driving device, when the target object is positioned in the second auxiliary driving device, the driving apparatus performs a second collection operation of picking up and collecting the target object from the second auxiliary driving device and a second loading operation of loading the target object, collected by the second collection operation, at the destination, and the driving apparatus includes a driving part, which drives along a driving path within a clean room using an autonomous driving method, and a handling part, which is provided in the driving part and performs a three-dimensional (3D) handling operation for the target object by moving in multiple axial directions.

According to another aspect of the present disclosure, an operating method of a driving system includes: handling a target object by enabling a driving apparatus and an auxiliary driving apparatus to interlock with each other, wherein the driving apparatus performs a handling operation for handling a target object, the auxiliary driving apparatus performs an auxiliary handling operation that assists the handling operation of the driving apparatus, and the driving apparatus and the auxiliary driving apparatus are interlinked using a wireless communication method to operate for the transportation and loading of the target object According to the aforementioned and other embodiments of the present disclosure, it is possible to comprehensively operate multiple robots to ensure accurate and safe acquisition and loading of target objects during the driving of a driving apparatus from the starting point to the destination.

Also, it is possible to prevent potential accidents such as personal injuries and product damage that may arise from manual handling of relatively heavy loads of target objects.

Additionally, it is possible to prevent the accumulation of workload resulting from repetitive manual handling of target objects, as well as the decrease of workability.

Moreover, it is possible to perform proactive management and post-management in connection with the acquisition and loading of target objects, ensuring that the target objects are appropriately positioned within predetermined ranges.

Furthermore, it is possible to prevent anomalies in function tests and subsequent processes that may arise from deviations of target objects from their predetermined positions, through proactive management and post-management.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a block diagram of a driving system according to an embodiment of the present disclosure;

FIG. 2 is a detailed block diagram of the driving system of FIG. 1;

FIGS. 3 and 4 are schematic views illustrating the operating positions of the driving apparatus and the auxiliary driving apparatus of FIG. 1;

FIGS. 5 and 6 are schematic views illustrating the configuration of the driving system of FIG. 1;

FIG. 7 is a schematic view illustrating the operating state of the driving system of FIG. 1;

FIG. 8 is a block diagram of a driving apparatus according to an embodiment of the present disclosure;

FIG. 9 is a detailed block diagram of the driving apparatus of FIG. 8;

FIG. 10 is a detailed block diagram of the driving apparatus of FIG. 9;

FIG. 11 is a perspective view of the driving apparatus of FIG. 8;

FIGS. 12 through 14 are schematic views illustrating the handling of a target object by the driving apparatus of FIG. 8;

FIGS. 15 through 20 are schematic views illustrating the identification of a target object by the driving apparatus of FIG. 8;

FIGS. 21 through 24 are schematic views illustrating the loading of a target object by the driving apparatus of FIG. 8;

FIGS. 25 through 27 are schematic views illustrating the collection of a target object by the driving apparatus of FIG. 8; and FIG. 28 is a flowchart illustrating an operating method of a driving apparatus according to an embodiment of the present disclosure.

DETAILED DESCRIPTION

Preferred embodiments of the present disclosure will be described in detail with reference to the accompanying drawings. The present disclosure and methods of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be through and complete and will fully convey the concept of the invention to those skilled in the art, and the present disclosure will only be defined by the appended claims. Like reference numbers designate like elements throughout the specification.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented, and, as such, the spatially relative descriptors used herein interpreted accordingly.

It will be understood that, although the terms "first", "second", etc. may be used herein to describe various elements, constituent elements and/or sections, the elements, constituent elements and/or sections should not be limited by these terms. These terms are only used to distinguish one element, constituent element, or section from another element, constituent element, or section. Thus, a first element, a first constituent element, or a first section discussed below should be termed a second element, a second constituent element, or a second section.

As used herein, the singular forms "a," "an," and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Exemplary embodiments of the present disclosure will hereinafter be described with reference to the accompanying drawings. Like reference numerals indicate like elements through the specification, and thus, detailed descriptions thereof will be omitted.

Referring to FIG. 1, a driving system 10 includes an auxiliary driving apparatus 300 and a driving apparatus 100. The auxiliary driving apparatus 300 includes auxiliary handling parts 310 and auxiliary handling parts 320.

Referring to FIGS. 1 and 2, multiple auxiliary handling parts 310 are provided for the respective auxiliary driving devices, i.e., first and second auxiliary driving devices 301 and a 302. Referring to FIGS. 3 through 5, the main driving apparatus 100 of the driving system 10 performs a handling operation for a target object 1.

The auxiliary driving apparatus 300 of the driving system 10 performs an auxiliary handling operation that assists the handling operation of the main driving apparatus 100. The main driving apparatus 100 and the auxiliary driving apparatus 300 are interlinked using a wireless communication method to operate for the transportation and loading of the target object 1.

The first auxiliary driving device 301 of the auxiliary driving apparatus interlocks with the main driving apparatus 100. The second auxiliary driving device 302 of the auxiliary driving apparatus 300 interlocks with the main driving apparatus 100. Here, the first and second auxiliary driving devices 301 and 302 sequentially interlock with the main driving apparatus 100 to enable the handling operation to be performed.

Also, if there exists a replacement target object 1 at a particular destination, the main driving apparatus 100 performs a first collection operation of collecting the replacement target object 1. The main driving apparatus 100 then performs a first loading operation of loading the replacement target object 1 collected through the first collection operation onto the first auxiliary driving device 301.

The target object 1 is positioned in the second auxiliary driving device 302. The main driving apparatus 100 performs a second collection operation of picking up and collecting the target object 1 from the second auxiliary driving device 302.

Also, the main driving apparatus 100 performs a second loading operation of unloading the target object 1, collected through the second collection operation, at the destination. The first auxiliary driving device 301 identifies the position of the main driving apparatus 100 and departs for the first loading operation.

Referring to FIG. 6, the second auxiliary driving device 302 identifies the position of the main driving apparatus 100 and departs for the second collection operation. Thereafter, the auxiliary driving apparatus 300 departs to a first location L1 to enable the first auxiliary driving device 301 to perform the first loading operation.

Moreover, the second auxiliary driving device 302 may perform a first relaying operation by departing to the first location L1 for the second collection operation to replace the first auxiliary driving device 301.

Referring to FIG. 7, unlike what is depicted in FIG. 6, the first auxiliary driving device 301 of the auxiliary driving apparatus 300 departs to the first location L1 for the first loading operation. Then, the second auxiliary driving device 302 of the auxiliary driving apparatus 300 departs to a second location L2, which differs from the first location L1, for the second collection operation. In this manner, a second relaying operation can be performed.

The auxiliary handling parts 310 of the auxiliary driving apparatus 300 drive along a driving path within a cleanroom using an autonomous driving method. The auxiliary handling parts 320 of the auxiliary driving apparatus 300, which are provided in the auxiliary handling parts 310, handle the target object 1 and the replacement target object 1.

Referring to FIG. 8, a driving apparatus 100 includes a handling part 110 and a driving part 120. The handling part 110 of the driving apparatus 100 includes a first mounting unit 111 and a pickup unit 112.

Referring to FIG. 9, the pickup unit 112 includes a vertically adjustable module 1121, a longitudinally adjustable module 1122, a contact module 1123, and a checking module 1124. The driving part 120 includes a first detection unit 121, a second detection unit 123, a third detection unit 122, and a driving unit 124.

Referring to FIG. 10, the checking module 1124 includes a first landing information provision section 1124a and a second landing information provision section 1124b. The second landing information provision section 1124b includes a contrast information generator 1124b1 and a vertical distance information generator 1124b2.

Referring to FIG. 11, the first mounting unit 111 includes a first landing module 1111, a second landing module 1112, and a fixing module 1113. The driving part 120 of the driving apparatus 100 drive along a driving path within a cleanroom using an autonomous driving method. The handling part 110 of the driving apparatus 100 is provided on top of the driving part 120.

The driving part 120 performs a three-dimensional (3D) handling operation for a target object 1 by moving in multiple axial directions. The first mounting unit 111 of the handling part 110 is positioned above the driving part 120 and mounts the target object 1 thereon.

The pickup unit 112 of the handling part 110 is positioned above the driving part 120. The pickup unit 112 picks up the target object 1 and inserts the target object 1 in, or removes the target object 1 from, the first mounting unit 111.

Additionally, the vertically adjustable module 1121 of the pickup unit 112 performs a first operation of moving in an up-and-down direction. The longitudinally adjustable module 1122 of the pickup unit 112 performs a second operation of moving in a longitudinal direction from the vertically adjustable module 1121.

The contact module 1123 of the pickup unit 112 is positioned in the longitudinally adjustable module 1122. The contact module 1123 performs a third operation of making contact with and picking up the target object 1.

The contact module 1123 performs a fourth operation of moving in a horizontal circumferential direction from the longitudinally adjustable module 1122. The first mounting unit 111 performs a fifth operation of moving in a direction away from the longitudinally adjustable module 1122.

The target object 1 lands on the first landing module 1111 of the first mounting unit 111. The fixing module 1113 of the first mounting unit 111 is provided around the first mounting unit 111. The fixing module 1113 may secure the circumference of the target object 1 on the first mounting unit 111 by contacting the target object 1.

The first landing module 1111 of the first mounting unit 111 is provided on one side of the target object 1. The second landing module 1112 of the first mounting unit 111 is positioned on the opposite side of the target object 1, with the first landing module 1111 and the target object 1 in between.

The first and second landing modules 1111 and 1112 and may operate in first and second landing modes. In the first landing mode, the first and second landing modules 1111 and 1112 accommodate the target object 1 while being fixed without moving.

The second landing mode corresponds to a state where the first and second landing modules 1111 and 1112 are adjusted to be in proximity to or apart from each other. In other words, before the landing of the target object 1, the first and second landing modules 1111 and 1112 are adjusted to be in proximity to or apart from each other.

In the second landing mode, the first and second landing modules 1111 and 1112 may be adjusted to be in proximity to correspond to the outer circumference of the target object 1 after the landing of the target object 1.

The fixing module 1113 may contact and secure the circumference of the target object 1 in accordance with the operation of the first and second landing modules 1111 and 1112.

The target object 1 moves between a first location L1, which corresponds to a starting position, a second location L2, which corresponds to the first mounting unit 111, and a third location, which corresponds to the second mounting unit 211 at the destination.

Referring to FIGS. 10 through 12, the second landing information provision section 1124b of the pickup unit 112 examines location information of the target object 1 for the acquisition and landing of the target object 1.

Referring to FIGS. 12 through 16, the target object 1 is provided with a first main identifier M11 and a second main identifier M12. The second mounting unit 211 is provided with first and second sub-identifiers M21 and M22, which correspond to the first and second main identifiers M11 and M12, respectively.

The first landing information provision section 1124a of the checking module 1124 examines the alignment status of the first and second main identifiers M11 and M12 in relation to the first and second sub-identifiers M21 and M22.

Based on the alignment of the first and second main identifiers M11 and M12, the first landing information provision section 1124a of the checking module 1124 provides first landing suitability information for the target object 1 to be landed at a designated position on the second mounting unit 211.

The contact module 1123 of the pickup unit 112 enables the target object 1 to be landed at the designated position based on the first landing suitability information. The target object 1 includes a probe card. The second mounting unit 211 includes a landing section provided in a probe station.

However, the present disclosure is not limited to this. That is, the target object 1 is not particularly limited to being a probe card. Similarly, the second mounting unit 211 is not particularly limited to being provided in a probe station.

The first landing information provision section 1124a determines the presence of any pre-existing load on the second mounting unit 211 before the placement of the target object 1. If there is no prior load present on the second mounting unit 211, the target object 1 can safely be positioned on the second mounting unit 211.

Referring to FIGS. 7, 13, and 17 and 18, the second mounting unit 211 is provided with circumferential portions 211T, which are designed to accommodate the target object 1. Here, the second landing information provision section 1124b of the checking module 1124 provides second landing suitability information regarding whether the landing state of the target object 1 on the second mounting unit 211 conforms to predetermined criteria, after the placement of the target object 1 on the second mounting unit 211.

The contrast information generator 1124b1 of the second landing information provision section 1124b generates contrast information by comparing the target object 1, accommodated within the second mounting unit 211, with the circumferential portions 211T.

The vertical distance information generator 1124b2 of the second landing information provision section 1124b generates vertical distance information by calculating the distance to be lifted or lowered from the second mounting unit 211 for acquiring or loading the target object 1.

Here, the second landing information provision section 1124b provides the second landing suitability information based on the contrast information and the vertical distance information. Specifically, the second landing information provision section 1124b generates the second landing suitability information by, for example, sequentially combining the contrast information and the vertical distance.

The contrast information is generated based on the difference in height between the target object 1 and the circumferential portions 211T of the second mounting unit 211 when the target object 1 is in a landed state. While driving along the driving path, the contact module 1123 operates in a first mode where the contact module 1123 contacts and secures the target object 1 located on the first mounting unit 111, from above the target object 1.

The vertically adjustable module 1121 operates in a second mode where the target object 1 is moved upward while being mounted on the contact module 1123. The longitudinally adjustable module 1122 operates in a third mode where the longitudinally adjustable module 1122 protrudes from the vertically adjustable module 1121 after the second mode.

Moreover, the vertically adjustable module 1121 operates in a fourth mode where the vertically adjustable module 1121 is guided to move downward after the third mode. The target object 1 is transferred from the first mounting unit 111 to the second mounting unit 211 through the first through fourth modes.

Referring to FIGS. 10, 19, and 20, the driving unit 124 of the driving part 120 performs an operation for the driving of the driving apparatus 100. The first detection unit 121 of the driving part 120 is provided on the driving unit 124 to handle the target object 1.

The first detection unit 121 calculates first displacement information by detecting displacement coordinate information, in a theta direction, of a first region of a target mounter O (e.g., the second mounting unit 211 or a probe station where the second mounting unit 211 is provided) where the target object 1 is positioned.

The second detection unit 123 of the driving part 120 is provided on the driving unit 124 to handle the target object 1. The second detection unit 123 generates second displacement information by detecting displacement coordinate information, in the theta direction, of a second region of the target mounter O where the target object 1 is positioned.

The second region of the target mounter O includes areas that are side-by-side with the first region. The driving unit 124 performs a first correction operation and a handling operation.

The first correction operation of the driving unit 124 corrects the positional deviation from the target mounter O based on the first displacement information and the second displacement information. The handling operation of the driving unit 124 adjusts the displacement distance from the target mounter O, thereby enabling the handling operation of the handling part 110.

Meanwhile, the third detection unit 122 of the driving part 120 detects the displacement distance from the target mounter O and generates third displacement information. The driving unit 124 performs a second correction operation of adjusting the displacement distance from the target mounter O based on the third displacement information, thereby enabling the handling operation of the handling part 110.

An exemplary scenario of loading the target object 1 will hereinafter be described with reference to FIGS. 21 through 24. Referring to FIG. 21, the pickup unit 112 picks up the target object 1 and performs ascent, forward, and descent motions.

Referring to FIG. 22, the first landing information provision section 1124a examines the alignment status of the first and second main identifiers M11 and M12 in relation to the first and second sub-identifiers M21 and M22.

In this manner, the first landing information provision section 1124a provides the first landing suitability information for the target object 1 to be landed at the designated position on the second mounting unit 211.

Referencing FIG. 23, based on the first landing suitability information, relevant correction values are calculated, and at least the first, second, and fourth operations are performed. Thereafter, the alignment between the target object 1 and the second mounting unit 211, achieved by the first, second, and fourth operations, is finally identified.

The first landing information provision section 1124a senses the distance between the target object 1 and the second mounting unit 211. Thereafter, the pickup unit 112 descends to its designated position.

Referring to FIG. 24, after loading the target object 1, the pickup unit 112 performs an ascent motion. During the elevation operation, the second landing information provision section 1124b compares the circumference of the target object 1 mounted on the second mounting unit 211 with the circumferential portions 211T of the second mounting unit 211 to determine whether the target object 1 is properly accommodated within the second mounting unit 211 (e.g., at an appropriate depth). Thereafter, the pickup unit 112 returns to its original position through a reverse motion and a descent motion.

An exemplary scenario of collecting the target object 1 with the pickup unit 112 will hereinafter be described with reference to FIGS. 25 through 27. Referring to FIG. 25, the pickup unit 112 performs ascent, forward, and descent motions for the collection of the target object 1.

The first landing information provision section 1124a examines the alignment status of the first and second main identifiers M11 and M12 in relation to the first and second sub-identifiers M21 and M22.

In this manner, the pickup unit 112 that acquires the target object 1 calculates correction values for the target object 1 and performs an alignment operation to be aligned with the position of the target object 1.

After the examination of the result of the alignment operation, the pickup unit 112 descends toward the target object 1 based on the operation of the second landing information provision section 1124b. Referring to FIG. 27, the pickup unit 112 collects the target object 1 and ascends. Thereafter, the pickup unit 112 returns to its original position through reverse and descent motions.

Referring to FIG. 28, an operation method S100 prepares the driving apparatus 100 for the handling of the target object 1. The driving part 120 of the driving apparatus 100 drives along a driving path within a cleanroom using an autonomous driving method.

Through the navigation of the driving part 120, the pickup and loading of the target object 1 may be repeatedly performed. Here, the driving apparatus 100 is provided with the driving part 120 and performs a 3D handling of the target object 1 by moving in multiple axial directions.

Meanwhile, as described earlier, a driving apparatus and an auxiliary driving apparatus are interlinked to handle a target object. Here, the driving apparatus performs a handling operation for the target object.

The auxiliary driving apparatus performs an auxiliary handling operation that assists the handling operation of the driving apparatus. The driving apparatus and the auxiliary driving apparatus are interconnected using a wireless communication method to operate for the transportation and loading of the target object.

Embodiments of the present disclosure have been described above with reference to the accompanying drawings, but the present disclosure is not limited thereto and may be implemented in various different forms. It will be understood that the present disclosure can be implemented in other specific forms without changing the technical spirit or gist of the present disclosure. Therefore, it should be understood that the embodiments set forth herein are illustrative in all respects and not limiting.

What is claimed is:

1. A driving system comprising:
    a driving apparatus performing a handling operation for handling a target object; and
    an auxiliary driving apparatus performing an auxiliary handling operation that assists the handling operation of the driving apparatus,
    wherein:
    the driving apparatus and the auxiliary driving apparatus are interlinked using a wireless communication method to operate for a transportation and loading of the target object,
    the auxiliary driving apparatus includes first and second auxiliary driving devices, which interlock with the driving apparatus, and
    the first and second auxiliary driving devices sequentially interlock with the driving apparatus to enable the handling operation.

2. The driving system of claim 1, wherein the driving apparatus performs a first collection operation of collecting any replacement target object at a destination and a first loading operation of loading the replacement target object, collected by the first collection operation, in the first auxiliary driving device.

3. The driving system of claim 2, wherein
    the target object is positioned in the second auxiliary driving device, and
    the driving apparatus performs a second collection operation of picking up and collecting the target object from the second auxiliary driving device and a second loading operation of loading the target object, collected by the second collection operation, at the destination.

4. The driving system of claim 3, wherein
    the first auxiliary driving device identifies a position of the driving apparatus and departs for the first loading operation, and
    the second auxiliary driving device identifies the position of the driving apparatus and departs for the second loading operation.

5. The driving system of claim 4, wherein the auxiliary driving apparatus performs a first relaying operation where the second auxiliary driving apparatus departs to a first location for the second collection operation to replace the first auxiliary driving device after the departure of the first auxiliary driving device to the first location for the first loading operation.

6. The driving system of claim 4, wherein the auxiliary driving apparatus performs a second relaying operation where the first auxiliary driving device departs to a first location for the first loading operation and the second auxiliary driving device departs to a second location, which is different from the first location, for the second collection operation.

7. The driving system of claim 4, wherein the auxiliary driving apparatus includes an auxiliary driving part, which drives along a driving path within a clean room using an autonomous driving method, and an auxiliary handling part, which is provided in the auxiliary driving part and handles the target object and the replacement target object.

8. The driving system of claim 1, wherein the driving apparatus includes a driving part, which drives along a driving path within a clean room using an autonomous driving method, and a handling part, which is provided in the driving part and performs a three-dimensional (3D) handling operation for the target object by moving in multiple axial directions.

9. The driving system of claim 8, wherein the handling part includes a first mounting unit, which is positioned above the driving part and is for mounting the target object, and a pickup unit, which is positioned above the driving part and is for inserting the target object in, or removing the target object from, the first mounting unit.

10. The driving system of claim 9, wherein the pickup unit includes a vertically adjustable module, which performs a first operation of moving in an up-and-down direction, a longitudinally adjustable module, which performs a second operation of moving in a longitudinal direction from the vertically adjustable module, and a contact module, which is positioned in the longitudinally adjustable module and performs a third operation of making contact with and picking up the target object.

11. The driving system of claim 10, wherein
the contact module performs a fourth operation of moving in a horizontal circumferential direction from the longitudinally adjustable module, and
the first mounting unit performs a fifth operation of moving in a direction away from the longitudinally adjustable module.

12. The driving system of claim 10, wherein
the target object is accommodated in the first mounting unit, and
the first mounting unit includes a fixing module, which is installed around a circumference of the first mounting unit and is for contacting and securing a circumference of the target object.

13. The driving system of claim 12, wherein
the first mounting unit further comprises a first landing module, which is provided on one side of the target object, and a second landing module, which is provided on the other side of the target object with the first landing module and the target object in between,
the first and second landing modules are operable in one of a first landing mode, where the first and second landing modules accommodate the target object while being fixed, and a second landing mode, where the first and second landing modules accommodate the target object while being adjusted to be in proximity to or apart from each other, and
the fixing module contacts and secures the circumference of the target object in accordance with the operation of the first and second landing modules.

14. The driving system of claim 10, wherein the target object moves between a first location, which corresponds to a starting position, a second location, which corresponds to the first mounting unit, and a third location, which corresponds to a second mounting unit at a destination.

15. The driving system of claim 14, wherein the pickup unit further includes a checking module, which examines location information of the target object for the acquisition and landing of the target object.

16. The driving system of claim 15, wherein
the target object is provided with first and second main identifiers,
the second mounting unit is provided with first and second sub-identifiers, which correspond to the first and second main identifiers, respectively,
the checking module includes a first landing information provision section, which provides first landing suitability information for the target object to be landed at a designated position on the second mounting unit, and
the pickup unit enables the target object to be landed at the designated position based on the first landing suitability information.

17. The driving system of claim 16, wherein
the target object includes a probe card, and
the second mounting unit includes a landing section provided within a probe station.

18. A driving system comprising:
a driving apparatus performing a handling operation for handling a target object; and
an auxiliary driving apparatus performing an auxiliary handling operation that assists the handling operation of the driving apparatus,
wherein
the driving apparatus and the auxiliary driving apparatus are interlinked using a wireless communication method to operate for a transportation and loading of the target object,
the auxiliary driving apparatus includes first and second auxiliary driving devices, which interlock with the driving apparatus,
the first and second auxiliary driving devices sequentially interlock with the driving apparatus to enable the handling operation,
the driving apparatus performs a first collection operation of collecting any replacement target object at a destination and a first loading operation of loading the replacement target object, collected by the first collection operation, in the first auxiliary driving device,
when the target object is positioned in the second auxiliary driving device, the driving apparatus performs a second collection operation of picking up and collecting the target object from the second auxiliary driving device and a second loading operation of loading the target object, collected by the second collection operation, at the destination, and
the driving apparatus includes a driving part, which drives along a driving path within a clean room using an autonomous driving method, and a handling part, which is provided in the driving part and performs a three-dimensional (3D) handling operation for the target object by moving in multiple axial directions.

19. An operating method of a driving system, comprising:
handling a target object by enabling a driving apparatus and an auxiliary driving apparatus to interlock with each other,
wherein
the driving apparatus performs a handling operation for handling a target object,
the auxiliary driving apparatus performs an auxiliary handling operation that assists the handling operation of the driving apparatus, and
the driving apparatus and the auxiliary driving apparatus are interlinked using a wireless communication method to operate for a transportation and loading of the target object,
the auxiliary driving apparatus includes first and second auxiliary driving devices, which interlock with the driving apparatus, and
the first and second auxiliary driving devices sequentially interlock with the driving apparatus to enable the handling operation.

* * * * *